United States Patent
McGrath et al.

(10) Patent No.: US 8,975,866 B2
(45) Date of Patent: Mar. 10, 2015

(54) SYSTEMS AND METHODS FOR BATTERY LIFE MAXIMIZATION UNDER FIXED-ROUTE APPLICATIONS

(71) Applicant: Proterra Inc., Greenville, SC (US)

(72) Inventors: Seamus McGrath, Simpsonville, SC (US); Reuben Sarkar, Greenville, SC (US); Michael Finnern, Greer, SC (US)

(73) Assignee: Proterra Inc., Greenville, SC (US)

( * ) Notice: Subject to any disclaimer, the term of this patent is extended or adjusted under 35 U.S.C. 154(b) by 0 days.

(21) Appl. No.: 14/249,175

(22) Filed: Apr. 9, 2014

(65) Prior Publication Data

US 2014/0217976 A1  Aug. 7, 2014

Related U.S. Application Data

(63) Continuation of application No. PCT/US2012/059611, filed on Oct. 10, 2012.

(60) Provisional application No. 61/545,550, filed on Oct. 10, 2011.

(51) Int. Cl.
*H02J 7/00* (2006.01)
*B60L 11/18* (2006.01)
*B60L 15/20* (2006.01)

(52) U.S. Cl.
CPC .......... *B60L 11/1809* (2013.01); *Y02T 10/7044* (2013.01); *Y02T 10/7005* (2013.01); *B60L 11/1837* (2013.01); *B60L 11/1862* (2013.01); *B60L 15/2045* (2013.01); *B60L 2200/18* (2013.01); *Y02T 10/7088* (2013.01); *Y02T 10/705* (2013.01); *Y02T 90/14* (2013.01); *Y02T 90/128* (2013.01); *B60L 2200/26* (2013.01)
USPC ....................................................... 320/109

(58) Field of Classification Search
CPC ... Y02T 90/14; Y02T 10/7005; Y02T 90/128; Y02T 10/7088; Y02T 90/16
USPC ....................................................... 320/109
See application file for complete search history.

(56) References Cited

U.S. PATENT DOCUMENTS

| 8,228,035 | B2 * | 7/2012 | Munukur et al. | 320/132 |
| 2005/0256631 | A1 * | 11/2005 | Cawthorne et al. | 701/99 |
| 2008/0319595 | A1 * | 12/2008 | Yamamoto et al. | 701/22 |
| 2009/0114463 | A1 | 5/2009 | DeVault | |
| 2010/0017249 | A1 * | 1/2010 | Fincham et al. | 705/8 |

FOREIGN PATENT DOCUMENTS

| JP | 2000-287302 A | 10/2000 |
| JP | 2006-054958 A | 2/2006 |
| JP | 2010-183785 A | 8/2010 |
| JP | 2010-239849 A | 10/2010 |
| JP | 2011-120327 A | 6/2011 |

OTHER PUBLICATIONS

International Search Report issued Mar. 22, 2013 in parent application PCT/US2012/059611 (2 pages).

* cited by examiner

*Primary Examiner* — Arun Williams
(74) *Attorney, Agent, or Firm* — Bookoff McAndrews PLLC

(57) ABSTRACT

An embodiment of the invention provides a method of charging an energy storage system for an electric vehicle. The method includes determining the estimated consumption for a specific route of the electric vehicle at different times and setting a target end point for the energy storage system based upon a minimum state of charge level for the energy storage system. The method further includes determining charge set points for the energy storage system based upon the target end point and the determined estimated consumption and determining the actual end point of the energy storage system after operation of the electric vehicle on the given route. The method also includes comparing the actual end point to the target end point and determining the difference in state of charge for the energy storage system between the actual end point and the target end point. In addition, the method includes using the difference between the actual end point and the target end point to adjust the charge set points for the energy storage system.

20 Claims, 19 Drawing Sheets

Base Consumption Table

| 11 am | 20 kWh | 20 kWh | 20 kWh | 20 kWh | 20 kWh | 20 kWh | 20 kWh |
|---|---|---|---|---|---|---|---|
| 10 am | 20 kWh | 20 kWh | 20 kWh | 20 kWh | 20 kWh | 20 kWh | 20 kWh |
| 9 am | 20 kWh | 20 kWh | 20 kWh | 20 kWh | 20 kWh | 20 kWh | 20 kWh |
| 8 am | 20 kWh | 20 kWh | 20 kWh | 20 kWh | 20 kWh | 20 kWh | 20 kWh |
| 7 am | 20 kWh | 20 kWh | 20 kWh | 20 kWh | 20 kWh | 20 kWh | 20 kWh |
| 6 am | 20 kWh | 20 kWh | 20 kWh | 20 kWh | 20 kWh | 20 kWh | 20 kWh |
| Last updated 6 am | M | T | W | Th | Fr | Sa | S |

Figure 6

Base Consumption Table

| 11 am | 20 kWh | 20 kWh | 20 kWh | 20 kWh | 20 kWh | 20 kWh | 20 kWh |
|---|---|---|---|---|---|---|---|
| 10 am | 30 kWh | 30 kWh | 30 kWh | 30 kWh | 30 kWh | 25 kWh | 25 kWh |
| 9 am | 40 kWk | 40 kWk | 40 kWk | 40 kWk | 40 kWk | 25 kWk | 25 kWk |
| 8 am | 35 kWh | 35 kWh | 35 kWh | 35 kWh | 35 kWh | 25 kWh | 25 kWh |
| 7 am | 25 kWh | 25 kWh | 25 kWh | 25 kWh | 25 kWh | 20 kWh | 20 kWh |
| 6 am | 20 kWh | 20 kWh | 20 kWh | 20 kWh | 20 kWh | 20 kWh | 20 kWh |
| Last updated 6 am | M | T | W | Th | Fr | Sa | S |

Figure 7

Consumption (DOD) - Conversion from KWh to Depth of Discharge (DOD)

| 11 am | 20 % | 20 % | 20 % | 20 % | 20 % | 20 % | 20 % |
|---|---|---|---|---|---|---|---|
| 10 am | 30 % | 30 % | 30 % | 30 % | 30 % | 25 % | 25 % |
| 9 am | 40 % | 40 % | 40 % | 40 % | 40 % | 25 % | 25 % |
| 8 am | 35 % | 35 % | 35 % | 35 % | 35 % | 25 % | 25 % |
| 7 am | 25 % | 25 % | 25 % | 25 % | 25 % | 20 % | 20 % |
| 6 am | 20 % | 20 % | 20 % | 20 % | 20 % | 20 % | 20 % |
| Last updated 6 am | M | T | W | Th | Fr | Sa | S |

Figure 8

- SET POINT ($S_{i,j}$) - STATE OF CHARGE AT BEGINNING OF DRIVE CYCLE
  - i = TIME OF SCHEDULED OPPORTUNITY CHARGES
  - j = TIME OF DAY
- TARGET END POINT ($E_T$) - MIN SOC AT THE END OF DRIVE CYCLE
  - SET TO MAXIMIZE BATTERY LIFE
  - FIXED VARIABLE
- ACTUAL END POINT ($E_{A,i}$) - ACTUAL SOC AT THE END OF DRIVE CYCLE
- ERROR ($\varepsilon_i$) - ($E_T$ - $E_{A,i}$)
- CONSUMPTION ($C_{i,j}$) - PREDICTED CONSUMPTION TO COMPLETE DRIVE CYCLE
  - i = TIME OF SCHEDULED OPPORTUNITY CHARGES
  - j = TIME OF DAY
  - i>j LONGER TERM
  - i=j SHORTER TERM; OCCURS AT THE TIME OF OPPORTUNITY CHARGE
  - CALCULATE UNTIL i=j

Figure 10

| i | -1 | 0 | 1 | 2 | 3 | 4 | 5 | ..... |
|---|---|---|---|---|---|---|---|---|
| $S_{i,j}$ | | $=C_{0,j}+$ $E_T+\varepsilon_{i-1}$ | $=C_{1,j}+$ $E_T+\varepsilon_{i-1}$ | $=C_{2,j}+$ $E_T+\varepsilon_{i-1}$ | $=C_{3,j}+$ $E_T+\varepsilon_{i-1}$ | $=C_{4,j}+$ $E_T+\varepsilon_{i-1}$ | $=C_{5,j}+$ $E_T+\varepsilon_{i-1}$ | ..... |
| $E_T$ | 10% | 10% | 10% | 10% | 10% | 10% | 10% | |
| $E_{A,i}$ | $E_T - E_{A,i}$ | | | | | | | |
| $\varepsilon_i$ | | | | | | | | |
| $C_{i,j}$ | | Calc | | | | | | |
| $\Delta(i+1)-i$ | | $S_{i+1,j} - S_{i,j}$ | | | | | | |
| $\Delta(i+2)-i$ | | $S_{i+2,j} - S_{i,j}$ | | | | | | |
| $\Delta(i+3)-i$ | | $S_{i+3,j} - S_{i,j}$ | | | | | | |

Figure 11

| CHARGE NUMBER | MON. | TUES. | WED. | THURS. | FRI. | SAT. | SUN. |
|---|---|---|---|---|---|---|---|
| 12 | 39% | ..... | ..... | ..... | ..... | ..... | ..... |
| 11 | 39% | 40% | ..... | ..... | ..... | ..... | ..... |
| 10 | 44% | 46% | 42% | ..... | ..... | ..... | ..... |
| 9 | 48% | 48% | 48% | 48% | ..... | ..... | ..... |
| 8 | 50% | 48% | 48% | 48% | 45% | ..... | ..... |
| 7 | 50% | 50% | 50% | 50% | 47% | 44% | ..... |
| 6 | 52% | 53% | 53% | 53% | 49% | 48% | 39% |
| 5 | 55% | 50% | 50% | 50% | 54% | 49% | 39% |
| 4 | 48% | 42% | 42% | 42% | 53% | 50% | 43% |
| 3 | 48% | 44% | 44% | 44% | 50% | 52% | 40% |
| 2 | 45% | 42% | 44% | 43% | 50% | 50% | 35% |
| 1 | 40% | 40% | 45% | 42% | 50% | 47% | 33% |

DESIRED CHARGE / DAY

Figure 12

SYSTEMS AND METHODS FOR BATTERY LIFE MAXIMIZATION UNDER FIXED-ROUTE APPLICATIONS

This application is a continuation of International Application No. PCT/US2012/059611 filed Oct. 10, 2012, which claims priority to U.S. Provisional Application No. 61/545,550 filed Oct. 10, 2011.

BACKGROUND

In recent years, hybrid and electric vehicles, which are provided with a battery, have been proposed, and some of them have been put into practice, to effectively use energy, in particular, regenerative energy as environmental measures. Typically, secondary batteries, which have been put to into practice and installed in vehicles so far, include, for example, lead storage batteries, nickel metal hydride batteries, or high powered lithium ion batteries. Some electric vehicles, such as electric cars, charge their batteries by plugging in the electric vehicle at a charging station. Other electric vehicles such as electric trains and light rail cars, are permanently connected to a power source through hardware in the railing or through overhead lines.

Recent trends in integrated transportation systems for electric vehicles, such as bus systems or other public transportation systems, have moved away from the use of permanent electrical connections to electric vehicles, as these systems are an eyesore, are unpopular, are costly to install and maintain, and can be unsafe. Some of these systems do not enable an electrical vehicle to run independent of a railing or overhead line. The speed of charging can be very pertinent for a heavy-duty vehicle, such as a bus, that may be regularly recharged within small time frames. More recent integrated transport systems may use fixed charging stations to rapidly charge heavy duty batteries used in electric vehicles. In one example, an electric vehicle may need to complete a charge in less than ten minutes that is sufficient to enable it to complete its normal route of nine to twelve miles in an hour before having to recharge.

One current common charging strategy for electric vehicles is to use a "worst case scenario" strategy where the battery cells for an electric vehicle are fully charged or charged as much as possible during each charging event. This may be optimal, for example, if the range of the electric vehicle needs to be maximized, if it may be difficult to predict the next charging event, or if consumption of the charge of the electric vehicle in the near future is unpredictable. However, such a charging strategy may result in cycling of the batteries within a state of charge (SOC) range that may be damaging or detrimental for the life of the batteries. Most battery cells tend to have a "sweet spot" for charging in the lower SOC range, which may be 10-40% of total charge, 20-60% of total charge, or another range, depending upon the battery chemistry used and the specific configuration used in the electric vehicle.

Thus, a need exists for a systems and methods for maximizing the battery life of electric vehicles by maximizing SOC cycling in less damaging areas of the SOC range.

SUMMARY OF THE INVENTION

Embodiments of the invention provides systems and methods for maximizing the battery life of electric vehicles by maximizing SOC cycling in less damaging areas of the SOC range. Various aspects of embodiments of the invention described herein may be applied to any of the particular applications set forth below or for any other types of vehicles or power sources or for any application requiring rapid charging of an energy storage system. Embodiments of the invention may be applied as a standalone system or method, or as part of an integrated transportation system, such as a bus system or other public transportation system. It shall be understood that different aspects of the invention can be appreciated individually, collectively, or in combination with each other.

An embodiment of the invention provides a method of charging an energy storage system for an electric vehicle. The method includes determining the estimated consumption for a specific route of the electric vehicle at different times and setting a target end point for the energy storage system based upon a minimum state of charge level for the energy storage system. The method further includes determining charge set points for the energy storage system based upon the target end point and the determined estimated consumption and determining the actual end point of the energy storage system after operation of the electric vehicle on the given route. The method also includes comparing the actual end point to the target end point and determining the difference in state of charge for the energy storage system between the actual end point and the target end point. In addition, the method includes using the difference between the actual end point and the target end point to adjust the charge set points for the energy storage system.

Determining the estimated consumption may also include establishing a consumption table for operation of the electric vehicle, receiving modifiers to the consumption table from one or more data connection means, adjusting the consumption table based on the modifiers, and using the consumption table to determine the estimated consumption for the electric vehicle over a specific period.

Embodiments of the invention may also include obtaining battery characterization information about battery cells used in the energy storage system and determining the differences between charge set points, determining charge rate distributions to meet the charge set points, selecting one of the charge rate distributions based on the battery characterization information, and modifying the charge set points based on the selected charge rate distribution.

Embodiments of the invention may also include a computer program product that includes a computer usable medium having a computer readable program code embodied therein. The computer readable program code is adapted to be executed to implement a method of charging an energy storage system for an electric vehicle, wherein the method includes determining the estimated consumption for a specific route of the electric vehicle at different times and setting a target end point for the energy storage system based upon a minimum state of charge level for the energy storage system. The method further includes determining charge set points for the energy storage system based upon the target end point and the determined estimated consumption and determining the actual end point of the energy storage system after operation of the electric vehicle on the given route. The method also includes comparing the actual end point to the target end point and determining the difference in state of charge for the energy storage system between the actual end point and the target end point. In addition, the method includes using the difference between the actual end point and the target end point to adjust the charge set points for the energy storage system.

Embodiments of the invention include a charging system for an electric vehicle. The charging system includes an energy storage system comprising a plurality of battery cells, with the energy storage system located within the electric vehicle. The charging apparatus is separably coupled with the electric vehicle to charge the plurality of battery cells. The charging system also includes means for receiving one or more factors affecting charging parameters for the battery cells.

The charging system also includes a charge control system for the energy storage system and charging apparatus, with the charge control system including logic for determining the estimated consumption for a specific route of the electric vehicle at different times. The charge control system also includes logic for setting a target end point for the energy storage system based upon a minimum state of charge level for the energy storage system and logic for determining charge set points for the energy storage system based upon the target end point and the determined estimated consumption. Additionally, the charge control system also includes logic for determining the actual end point of the energy storage system after operation of the electric vehicle on the given route and logic for comparing the actual end point to the target end point and determining the difference in state of charge for the energy storage system between the actual end point and the target end point. In addition, the charge control system further includes logic for using the difference between the actual end point and the target end point to adjust the charge set points for the energy storage system.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings.

FIG. 6 is a base consumption table for operation of an electric vehicle according to an embodiment of the invention.

FIG. 7 is a base consumption table that has been adjusted for long-term modifiers according to an embodiment of the invention.

FIG. 8 is a base consumption table showing estimated consumption in terms of depth of discharge according to an embodiment of the invention.

FIG. 10 is a list of variables and factors used for the charge and consumption algorithm shown in FIG. 4 and FIG. 9.

FIG. 11 is a chart showing calculations for the consumption algorithm shown in FIG. 4 and the exemplary chart in FIG. 9 according to an embodiment of the invention.

FIG. 12 is a set point table showing different set point values for different times and charging opportunities according to an embodiment of the invention.

DETAILED DESCRIPTION OF THE INVENTION

The invention provides systems and methods for maximizing the battery life of electric vehicles by maximizing SOC cycling in less damaging areas of the SOC range. Various aspects of the invention described herein may be applied to any of the particular applications set forth below, for electric or hybrid vehicles, or for any other types of vehicles. Various aspects of the invention described herein may be applied to any of the particular applications set forth below or for any other types of vehicles or power sources or for any application requiring rapid charging of an energy storage system. The invention may be applied as a standalone system or method, or as part of an integrated vehicle system. It shall be understood that different aspects of the invention can be appreciated individually, collectively, or in combination with each other.

Figure 1:
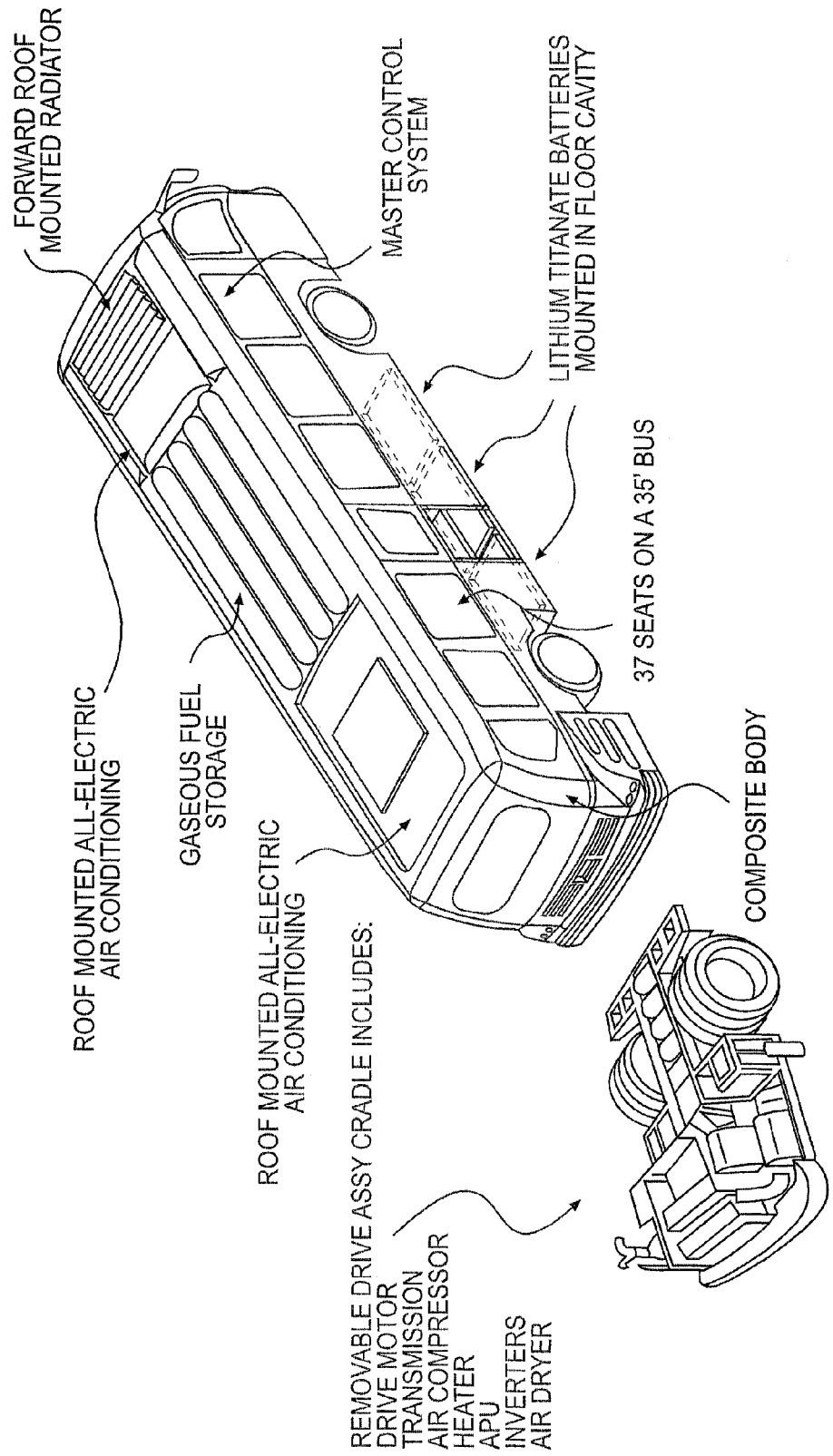
FIG. 1 shows a schematic of a bus with various features in accordance with one embodiment of the invention.

For example, electric vehicles powered by the system may include a transit bus with various features as shown in the schematic in FIG. 1, in accordance with one embodiment of the invention. The features of the bus may be applied to other types of vehicles, including a school bus, a delivery van, a shuttle bus, a tractor trailer, a class 5 truck (weighing 16,001-19,500 lbs., two-axle, six-tire single unit), a class 6 truck (weighing 19,501-26,000 lbs., three-axle single unit), a class 7 truck (weighing 26,001-33,000 lbs., four or more axle single unit), a class 8 truck (weighing 33,000 lbs. and over, four or less axle single trailer), a vehicle with a GVWR weighing over 14,000 pounds, a vehicle with a cargo to driver mass ratio of 15:1 or greater, a vehicle with six or more tires, a vehicle with three or more axles, passenger car, or any other type of vehicle.

The vehicle may have a propulsion power source, which includes batteries. These batteries may be packaged as battery cells, packs, modules, strings, or in other configurations. In some embodiments of the invention, the vehicle may have one or more additional power sources, such as a combustion engine or a fuel cell. The vehicle may be an electric battery-powered vehicle or a hybrid electric vehicle, and may be able to use the same basic battery configuration, drive motor, and controller, regardless of whether the vehicle is an all-battery vehicle or a hybrid vehicle.

The propulsion power source for the vehicle may include one or more battery assembly. A battery assembly may provide high voltage power to the traction motor, high power accessories, and low voltage accessories in the vehicle through the use of a converter. In one implementation of the invention, cells may be put in parallel to reduce cost of battery management systems since each cell voltage may be measured. However, in some other embodiments, with larger capacity cells, paralleling batteries before placing them in series may not be necessary. The use of larger capacity cells may increase the safety of the entire assembly without adding cost to the battery management system. Thus, batteries may be arranged in series or parallel, or any combination thereof. Such battery connection flexibility may also allow flexibility in battery placement. Such flexibility of battery placement may be beneficial wherever the batteries are distributed on the vehicle.

In some embodiments, a heavy-duty vehicle may travel a predetermined route, and stop at predetermined points for recharging. See, e.g., U.S. Pat. No. 3,955,657, which is hereby incorporated by reference in its entirety.

In one embodiment of the invention, the propulsion power source of the vehicle may include battery cells of various chemistries, including lithium iron phosphate (LFP), hard carbon/nickel cobalt manganese oxide (NCM), lithium manganese phosphate, lithium-ion chemistries, and others. In some implementations, the propulsion power source may include battery cells that are solely of a single chemistry type without requiring any other types of battery cells, and the battery cells may include any format or composition known in the art. The battery cells may be implemented in a number of configurations, including, but not limited to prismatic cells, cylindrical cells, button cells, pouch cells, and other configurations known to persons of skill in the art. Various modifications could also be made to the configuration of the battery cells such as using different C-rate or Ah battery cells, battery chemistries, and storage capacities.

A vehicle such as the transit bus shown in FIG. 1 may be used as part of an integrated transportation system utilizing electric vehicles, such as a bus system or other public transportation system. The electric vehicle may operate on a relatively fixed transit route on which the vehicle must complete its entire route before coming back to a specific location to recharge. In a conventional implementation, the electric vehicle's batteries may be fully charged at each charging event to avoid the infrequent scenario in which the entire capacity of the battery is required to complete a given route. However, if the electric vehicle operates on a fixed or predictable route, alternative SOC charging strategies may be implemented in accordance with embodiments of the invention to allow for improved battery life. If typical operation of the electric vehicle only uses half the capacity of the battery to complete a route, than charging to less than 100% capacity may be desirable in most cases. However, fear of not being able to predict future consumption requirements often results in a fixed charging strategy biased towards the worst case. This becomes more apparent when rapid charge requirements result in excess SOC being available through the rapid charge, but at the expense of the life of the battery cells.

The recharging of the electric vehicle's batteries may be performed using a conventional charging process or a rapid charging process such as that described in U.S. Provisional Patent Application No. 61/385,114 entitled "Systems and Methods for Equivalent Rapid Charging With Different Energy Storage Configurations," which is hereby incorporated by reference in its entirety. For example, the rapid charging process may be completed in a short amount of time to minimize vehicle 'down time' and maximize the operational time of the electrical vehicle in the field. The electric vehicle may need to complete a charge in less than ten minutes that is sufficient to enable it to complete its normal route of nine to twelve miles in an hour before having to recharge. However, modifications to the range of the system, charging times, usable SOC, amperage and voltages used in rapid charging, and others would be apparent to a person of skill in the art, and it is contemplated that the invention will also cover such modifications, variations, and equivalents.

Vehicle applications with fixed routes (or a limited selection of routes) and opportunity charging open the door to adaptive charging strategies that can move SOC cycling to the least damaging areas of the battery while still achieving desired performance and range requirements to get to the next opportunity charge. This may become particularly meaningful when trying to achieve rapid charge rates of 2 C or greater with conventional lithium ion chemistries. There is an SOC range for lithium chemistries where higher c-rate charging is less damaging. Maximizing overlap of charging events in this zone is an enabler to achieving longer cycle life in rapid charge applications.

Figure 2:
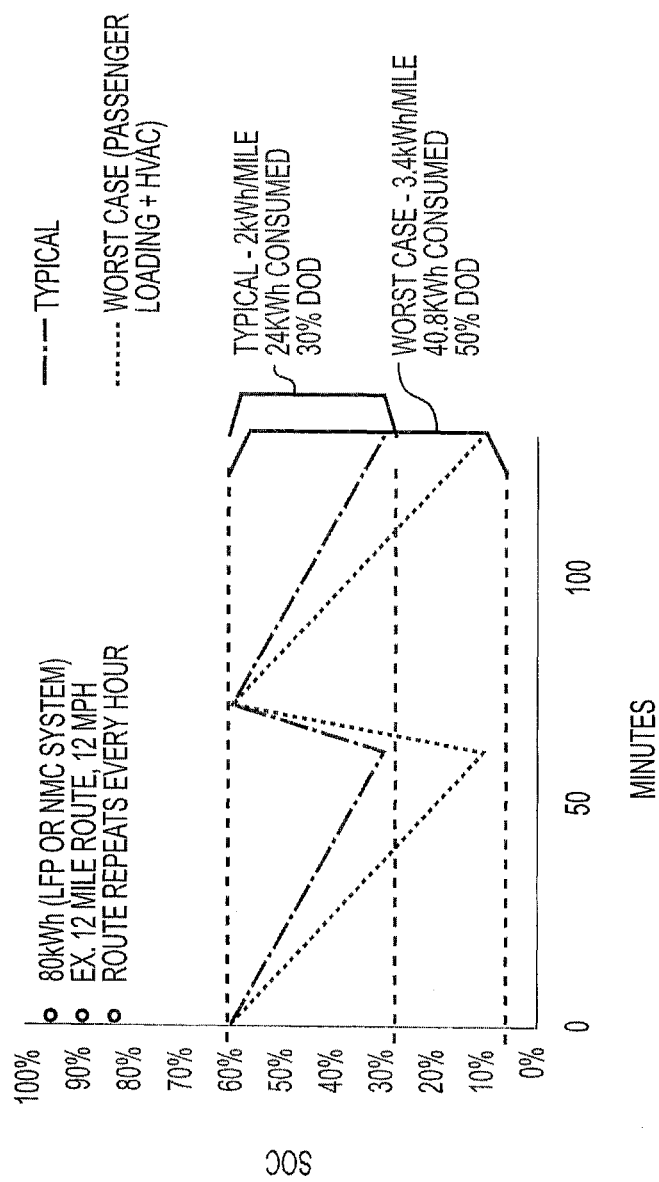
FIG. 2 is a chart showing exemplary charge and consumption cycles for operation of an electric vehicle on a fixed route according to an embodiment of the invention.

FIG. 2 is a chart showing exemplary charge and consumption cycles for operation of an electric vehicle on a fixed route according to an embodiment of the invention. During typical operation, the SOC of the battery cells of the electric vehicle may cycle between 30-60% of the vehicle's total SOC. To prevent the vehicle from running out of charge and being unable to complete its route, the initial set point during a charging event may be set to accommodate for a floor or minimum level of charge. For example, in the worst case scenario where the passenger load may be high and heating, ventilation, and air conditioning (HVAC) for the vehicle may be fully engaged, the consumption of the battery cells may increase, for example from 2 kWh/mile to 3.4 kWh/mile, resulting in a greater depth of discharge of the battery cells to around 10% SOC. However, the cycling range of 30-60% may not match the optimal cycling range of the energy storage system, which could be from 10-40% of SOC, 20-50% of SOC or another range, depending upon the battery cells used and the specific configuration used in the energy storage system.

Figure 3:
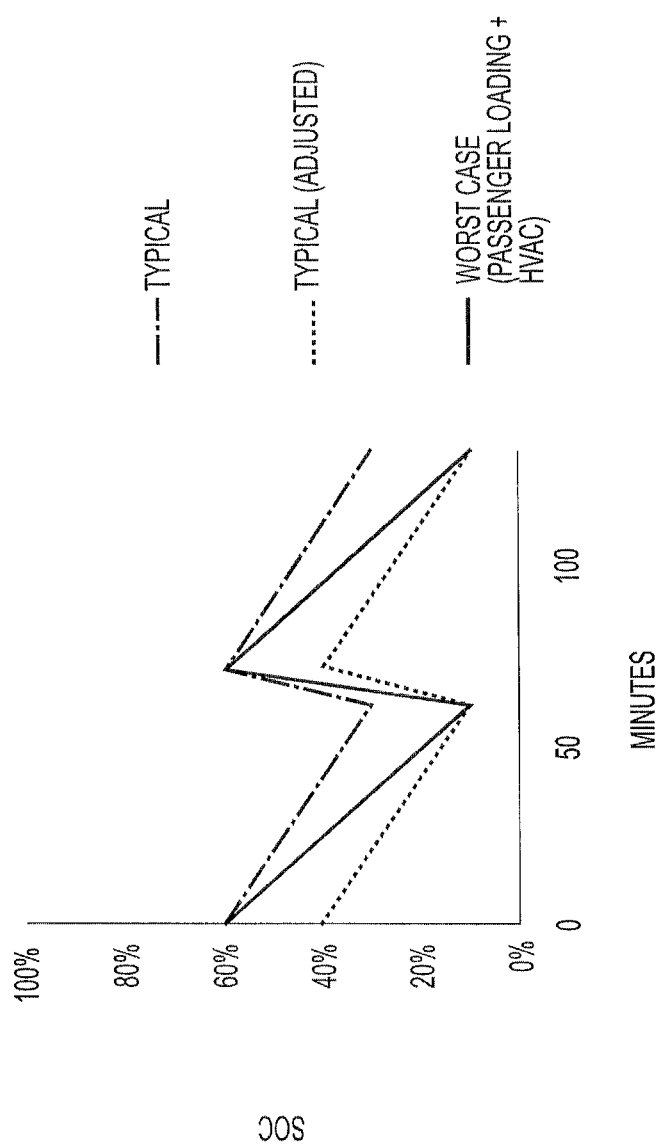
FIG. 3 is a chart showing shifted charge and consumption cycles for operation of an electric vehicle on a fixed route according to an embodiment of the invention.

FIG. 3 is a chart showing shifted charge and consumption cycles for typical operation of an electric vehicle on a fixed route according to an embodiment of the invention. In FIG. 3, the typical charge and consumption cycle has been shifted downwards from 30-60% of SOC to 10-40% to match the optimal cycling range of the energy storage system. While the initial charge levels have not been raised to a higher level to match that of the worst case scenario, charge and consumption cycle can be actively adjusted to accommodate greater energy consumption by using an adaptive set point strategy and more accurately predicting the consumption needed to complete future drive cycles and charging the energy storage system accordingly, as described herein. In particular, battery life can be maximized, particularly in fixed route rapid charge applications, through the selection of a charge set point that maximizes rapid charge cycles in the least damaging SOC ranges for a given cell and minimizes extreme charge rate outliers.

Figure 4:
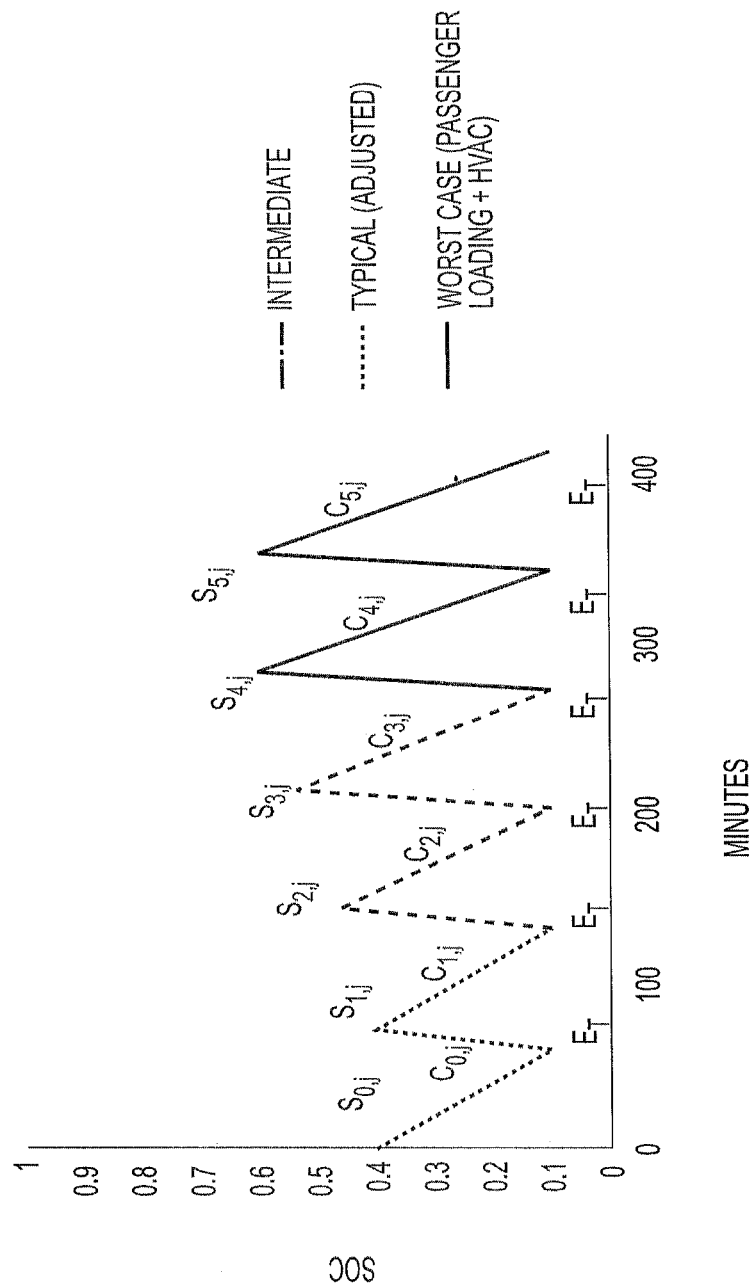
FIG. 4 is a flow chart showing a charge and consumption algorithm according to an embodiment of the invention.

FIG. 4 is a simplified flow chart showing a charge and consumption algorithm for an electric vehicle in according to an embodiment of the invention. In step 102 of FIG. 4, the estimated consumption for the electric vehicle is determined. This may be for one iteration of the electric vehicle's suggested route, operation of the electric vehicle for an entire day or week, or any period for which information about the electric vehicle's estimated consumption of energy may be obtained. The estimated consumption (or charge set points, as described later) may be in the form of a table, matrix, chart, data structure, or other data format, and may be based on information obtained from a variety of sources, including but not limited to prior field usage, test data, weather databases, traffic estimations, real-time traffic data, road construction information, local events such as concerts or conventions, onboard measurements, transit agency operating data, passenger counters, farebox information, battery management systems, traction motor, the power supply, converters, or other electric equipment, the HVAC system, GPS, and driver input. Data may be obtained through a variety of transmission means, including but not limited to 3G/4G wireless connectivity, WiFi, Bluetooth, the internet, the use of present programs or tabled data, CAN Network, battery management systems, data loggers, charging stations, a transit operating analysis, or simply by measuring the application data during or after operation.

Figure 5:
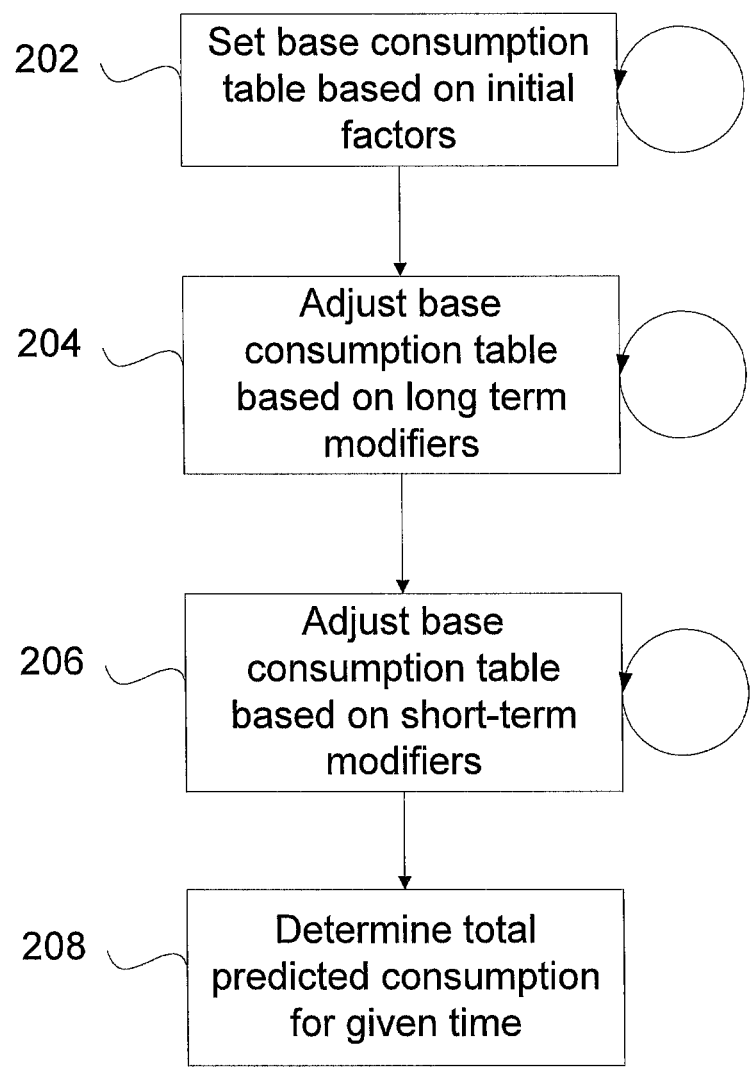
FIG. 5 is a flow chart showing processes for obtaining the estimated consumption for an electric vehicle according to an embodiment of the invention.

FIG. 5 is a flow chart showing processes for obtaining the estimated consumption for an electric vehicle according to an embodiment of the present invention. For example, step 102 in FIG. 4 may be performed using some or all of the processes shown in FIG. 5. In step 202, a base consumption table is established based on initial factors, as shown for example in FIG. 6. The estimated base consumption may be displayed in a table format with entries for the estimated consumption at a given time of the day on a given day of the week. The estimated consumption may be based upon the route profile and kWh required to complete the electric vehicle's specified route. While FIG. 6 and subsequent Figures may show operation of the electric vehicle from 6 AM to 11 AM, other times of operation may also be used in accordance with embodiments of the invention. The base consumption table may be periodically updated and/or process 202 periodically repeated when the route profile or other initial consumption factors of the vehicle change.

In step 204 of FIG. 5, the base consumption table created in step 202 is modified for long-term factors. An example of such an adjusted consumption table is shown as FIG. 7. The table may be modified to account for weekly, monthly, seasonal, or longer-term modifiers, including but not limited to the route type (CBD, COM, ARTERIAL), the route profile (flat, hilly, urban), base passenger load profile, historical HVAC loads, time of day changes, time of week changes, the desired reserve levels of SOC, expected electricity costs, and others. For example, the estimated consumption amounts for Monday may be greater between 8-10 AM to account for greater passenger loads or additional HVAC usage. Consumption amounts may also vary between weekdays to weekends, when the passenger load is lessened. In another example, summertime operation of the electric vehicle may result in consumption modifiers to account for higher electricity costs and HVAC loading, but also a lesser amount of passengers. Higher temperatures can lead to increased performance, but at the risk of shortened battery cell life, while lower temperatures within the operating range of the battery cells can allow for increased battery cell life. The external thermal effects from forecasted weather and the time of day can be factored into the consumption modifiers, with additional consumption projected if hot weather is forecasted. Conversely, reduced consumption may be projected near the end of the day when temperatures typically are lower, or if cool weather is predicted. Improved thermal management can dramatically improve the life of battery cells by maintaining the operating temperature of the cells within an optimal range, which may be a narrow range around 10° C., 15° C., 20° C., 25° C., 30° C., 35° C., or other ranges. Forecasted weather may also help to predict vehicle HVAC loading and the estimate range of the vehicle as well. The adjusted consumption table may be periodically updated and process 204 may be periodically repeated to accommodate for changes in the long-term modifiers affecting the consumption table.

In step 206 of FIG. 5, the modified consumption table shown in FIG. 7 may be modified to adjust for short term modifiers including but not limited to vehicle driver habits, the number of passengers, changes in weather, events such as a concert or large event, equipment problems or failures, remote commands, smart meter changes, other sources of load draw, and others. If the electric vehicle is scheduled to operate outside its normal schedule and offer shuttle service between parking lots for a large event, the projected short-term consumption of the electric vehicle may be high, due to increases in the passenger load on the vehicle and a more demanding route profile. Driver tendencies may also be used as a short-term modifier in determining projected consumption. One driver may tend to expend more kWh on a given route than another, or more experienced drivers may be more efficient in their operation of the vehicle as compared to inexperienced drivers. The short term modifiers described above may be updated in real-time or on a periodic basis, such as hourly or every fifteen minutes, to account for changes to the current condition of the electric vehicle.

In a specific embodiment of the invention, the long-term and short-term modifiers may also modify the base consumption table to accommodate for not only changes in consumption, but also changes in projected charging events. For example, the electric vehicle may be forced to skip a charging event due to a change in its operating schedule that forces the electric vehicle to operate on a significantly longer route than normal. In such an instance, the consumption table could be modified to increase the projected amount of consumption. If the electric vehicle was scheduled to skip charging events between 11 AM to 2 PM, the amount of projected consumption between those times could be increased to account for the additional consumption occurring without the charging events that are being skipped. As described in subsequent processes, the charge set point may be set at a higher level to accommodate for this increased consumption, while allowing the vehicle to continue on its projected route.

In a specific embodiment of the invention, the charge and consumption algorithm may be used as part of a demand-rate avoidance strategy that allows owners or operators of the electric vehicle to avoid charging the electric vehicle during periods of peak demand. In certain states and countries, utility rates for the use of electricity during times of peak usage (for example, between 12 PM-4 PM) may be drastically higher to encourage users to shift consumption to other periods. The charge and consumption algorithm according to embodiments of this invention may be shifted to allow the electric vehicle to continue during its normal time of operation, but only charge when it may be economically efficient to do so. The current demand rate for electricity can be used as a both a long-term and short-term modifier for the consumption table depending upon whether the increased demand rate is a long-term modifier for electricity pricing, or if it is a short-term modifier caused, for example, by a short-term change such as a heat wave causing an increase in overall electricity consumption in the local area for a period of time.

In step 208 of FIG. 6, the total predicted consumption is determined for a given time. This may be shown as a modified consumption table as shown in FIG. 7, which has already been adjusted for both long-term and short-term modifiers in accordance with steps 204 and 206. The consumption values in the modified consumption table in FIG. 7 may also be converted to from kWh to a value showing the depth of discharge of the energy storage system, as shown in FIG. 8. This may be performed by defining the conversion of kWh to DOD as a function of the vehicle's SOC. For example, if the vehicle's total SOC is 100 kWh, projected consumption of 20 kWh in a given period may be converted to a depth of discharge value of 20% by dividing the projected consumption for that period by the vehicle's total SOC. If the electric vehicle's total SOC was 60 kWh, the equivalent depth of discharge for the projected consumption value of 20 kWh would be 33.33%. Other alternative consumption tables or process flows could also be used. For example, the long-term and short-term modifiers could be calculated as changes to the base consumption table, and combined with the base consumption in another step.

Figure 9:
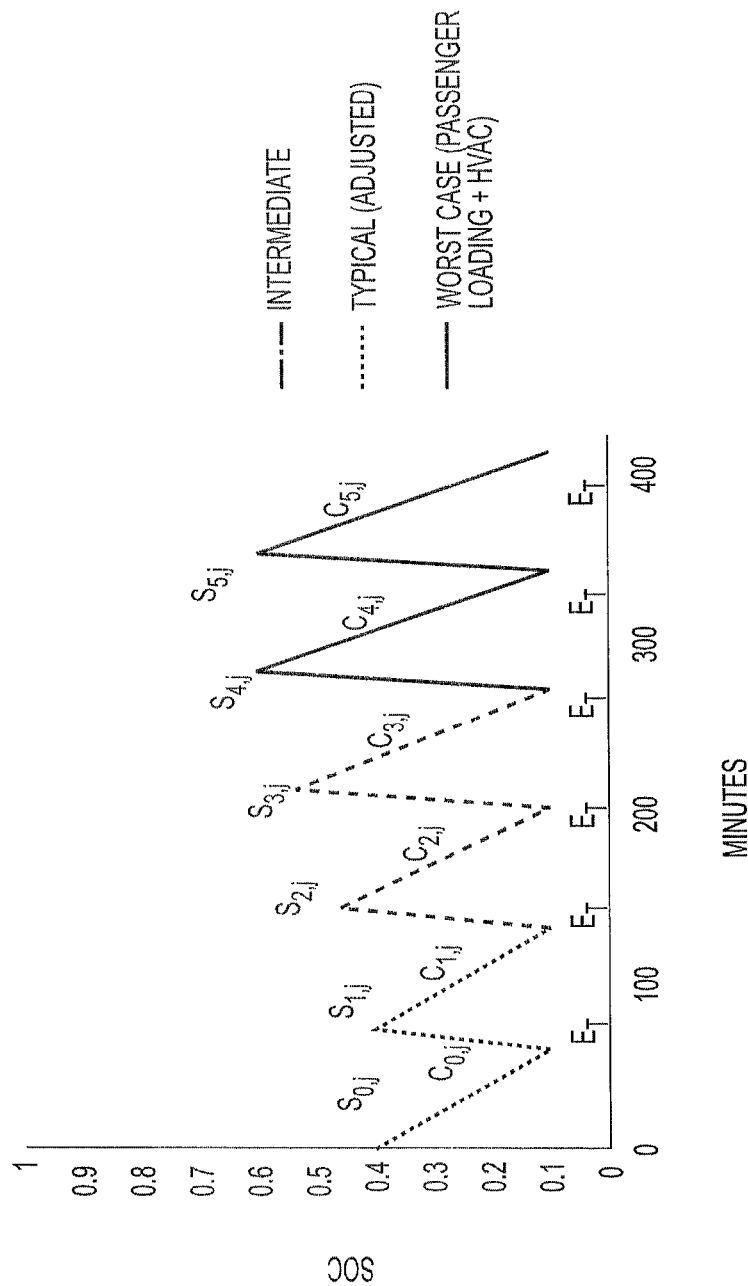
FIG. 9 is a chart showing projected charge and consumption cycles for operation of an electric vehicle on a fixed route during different conditions according to an embodiment of the invention.

The estimated consumption for a given time may also be described as a variable $C_{i,j}$ which describes the predicted consumption needed to complete a drive cycle. This may be better understood in conjunction with FIGS. 9-11. FIG. 9 is a chart showing projected charge and consumption cycles for operation of an electric vehicle on a fixed route during different conditions according to an embodiment of the invention. FIG. 10 is a list of variables and factors used for the charge and consumption algorithm shown in FIG. 4 and the chart in FIG. 9 according to an embodiment of the invention. FIG. 11 is a chart showing calculations for the consumption algorithm shown in FIG. 4 and the exemplary chart in FIG. 9 according to an embodiment of the invention.

For estimated consumption $C_{i,j}$, the variable i represents the next time a scheduled opportunity charge may arise, with the variable j representing the current time of day. For situations where i>j, the projected consumption in those instances is longer-term as those values represent consumption at a later time. Consumption when i=j is short-term and may be used the time of the charging opportunity, in addition to the longer-term consumption values, at to determine appropriate charging parameters. $C_{i,j}$ may be calculated until i=j as it is no longer necessary to predict consumption in relation to charging opportunities at times i which are less than j, meaning that the charging event and consumption has already occurred.

After the estimated consumption for the electric vehicle has been determined in step 102 of FIG. 4, the target end point for charging is determined in step 104. The target end point $E_T$ is the minimum SOC level that should be maintained at the end of the drive cycle. The value $E_T$ may be set to maintain a minimal reserve SOC amount to enable the electric vehicle to return to its charging station in the event of equipment failure or other factors preventing the vehicle from operating effectively. The end point $E_T$ may also be set to maximize the battery life depending upon the specifics of the particular energy storage system used, including but not limited to the battery cell, pack, and module configurations used, the electrical interconnections used between those configurations, and the specific battery chemistry employed. For example, the target end point $E_T$ may be set at 10% of SOC as shown in FIG. 11, to provide a minimum reserve SOC amount and also to allow the electric vehicle to cycle in an optimum range, which may be between 10% and 40% of the total SOC, as shown in FIG. 9 for typical adjusted operation of the electric vehicle.

In step 106 of FIG. 4, the charge set point for a charging opportunity is determined. The charge set point may expressed as a value $S_{i,j}$ representing the state of charge at the beginning of a drive cycle, with the variable i representing the next time a scheduled opportunity charge may arise, and the variable j representing the current time of day. The charge set point $S_{i,j}$ may be expressed using a set point table showing different set point values for different times and charging opportunities, as shown in FIG. 12. For example, an initial calculation of the set point values in the chart may be determined using the formula:

$$S_{i,j} = C_{i,j} + E_T$$

where $C_{i,j}$ is the estimated consumption determined in step 102 and $E_T$ is the target end point determined in step 104. Set point $S_{i,j}$ should be set at a value to allow the electric vehicle to complete its projected route before a scheduled charging opportunity may arise, represented by its estimated consumption $C_{i,j}$ while maintaining a minimum target end point of $E_T$ as a reserve. Furthermore, charge set point $S_{i,j}$ may also be adjusted accordingly to account for actual energy consumption during operation of the electric vehicle, as described below. The set point $S_{i,j}$ may also take into account projected charging events in the future. For example, a higher set point $S_{i,j}$ may be needed if consumption $C_{i,j}$ is increased due to long or short-term modifiers causing the electric vehicle to skip one or more charging events, or the set point $S_{i,j}$ may also be decreased if the electric vehicle may return for charging before its next scheduled charging event.

In step 108, the actual end point $E_{A,i}$ of the electric vehicle is determined after operation. This may be performed by monitoring the SOC of the battery cells at the end of each drive cycle. In step 110, the error $\epsilon_i$ between the target end point $E_T$ and the actual end point $E_{A,i}$ is determined by finding the difference between the two values. In step 112, the set point may be adjusted to modify the charge distribution between subsequent charges, discussed in more detail below. The error $\epsilon_i$ may be used to adjust future charge set points $S_{i,j}$ in step 114 using the formula:

$$S_{i,j} + C_{i,j} E_T + \epsilon_{i-1}$$

where $C_{i,j}$ is the estimated consumption determined in step 102, $E_T$ is the target end point determined in step 104, and $\epsilon_{i-1}$ is the difference between the target end point $E_T$ and the actual end point $E_A$ at the end of the prior drive cycle. If a charge set point table or other data representation has been used, the error determined $\epsilon_i$ may be used to update future charge set points contained within the charge set point table. The calculation of set point $S_{i,j}$ incorporating the error component may be better understood in accordance with the chart in FIG. 9 and FIG. 13, which are separated into operation of an electric vehicle in a typical consumption scenario, an intermediate consumption scenario where consumption is at a higher level, and a worst case scenario where passenger loading and HVAC operation may be at maximum levels. For a given charging cycle, if the target end point $E_T$ been set and the estimated consumption $C_{i,j}$ for the cycle has been determined, the target set-point may be for that cycle may be back-calculated to determine how much charge should be added to the energy storage system for the electric vehicle to allow the vehicle to complete its projected route while maintaining cycling at SOC levels least damaging to its battery cells. This process may be repeated for future drive cycles, so long as information is available to predict the estimated consumption of the electric vehicle. For example, the estimated consumption $C_{i,j}$ increases in FIG. 9 to account for the intermediate and worst-case scenarios where estimated consumption is higher. However, the error determined in step 110 has not been factored in during actual operation of the electric vehicle as the end points $E_T$ are the same for the drive cycles.

Figure 13:
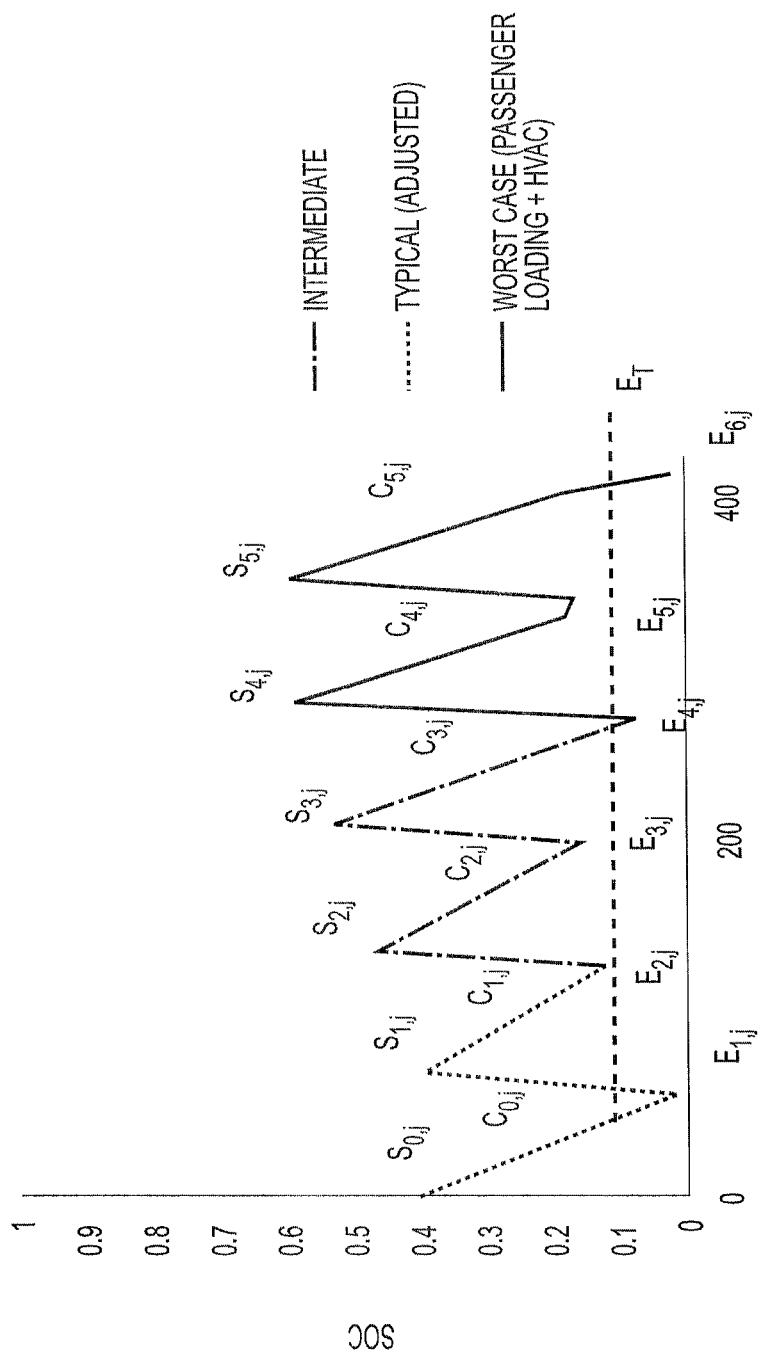
FIG. 13 is a chart showing charge and consumption cycles during operation of an electric vehicle on a fixed route during different conditions according to an embodiment of the invention.

FIG. 13 is a chart showing charge and consumption cycles during operation of an electric vehicle on a fixed route during different conditions according to an embodiment of the invention. While the target end point $E_T$ remains as at 10% of SOC, the actual end points $E_A$ are adjusted to account for the remaining SOC of the battery cells during each of the drive cycles, with the actual end points $E_A$ also used to project future consumption going forward. For example, actual consumption $C_{0,j}$ may be greater during the first charge cycle, resulting in an actual end point that $E_{1,j}$ is lower than the target end point $E_T$. As operation of the electric vehicle has resulted in a greater depth of discharge of the battery cells, the next charge set point $S_{1,j}$ may be set accordingly, for example to equal the sum of $C_{0,j}$, the actual consumption of the vehicle in the first cycle; $E_T$ the target end point, in this case 10% SOC, and the difference between the target end point $E_T$ and the actual end point $E_{1,j}$ at the end of the drive cycle.

At the set point $S_{3,j}$, the electric vehicle is operating in an intermediate consumption scenario but is projected to transition into a worst-case consumption scenario in the next drive cycle. To account for this, the next set point $S_{4,j}$ may be set at a higher level of SOC to accommodate for this increased level of consumption. Additionally, consumption $C_{3,j}$ during the drive cycle may also be greater than anticipated, as shown by the actual end point $E_{4,j}$ being at a lower level than the target end point. The charging algorithm used by the electric vehicle may take and use this real-time charging data to modify the next set point $S_{4,j}$, as well as subsequent set points to increase the battery life of the electric vehicle, while allowing it to maintain full functionality for its projected route. If the set points are maintained in a charge set point table or other data representation, multiple set points within the table may be updated to account for these changes.

Figure 14:
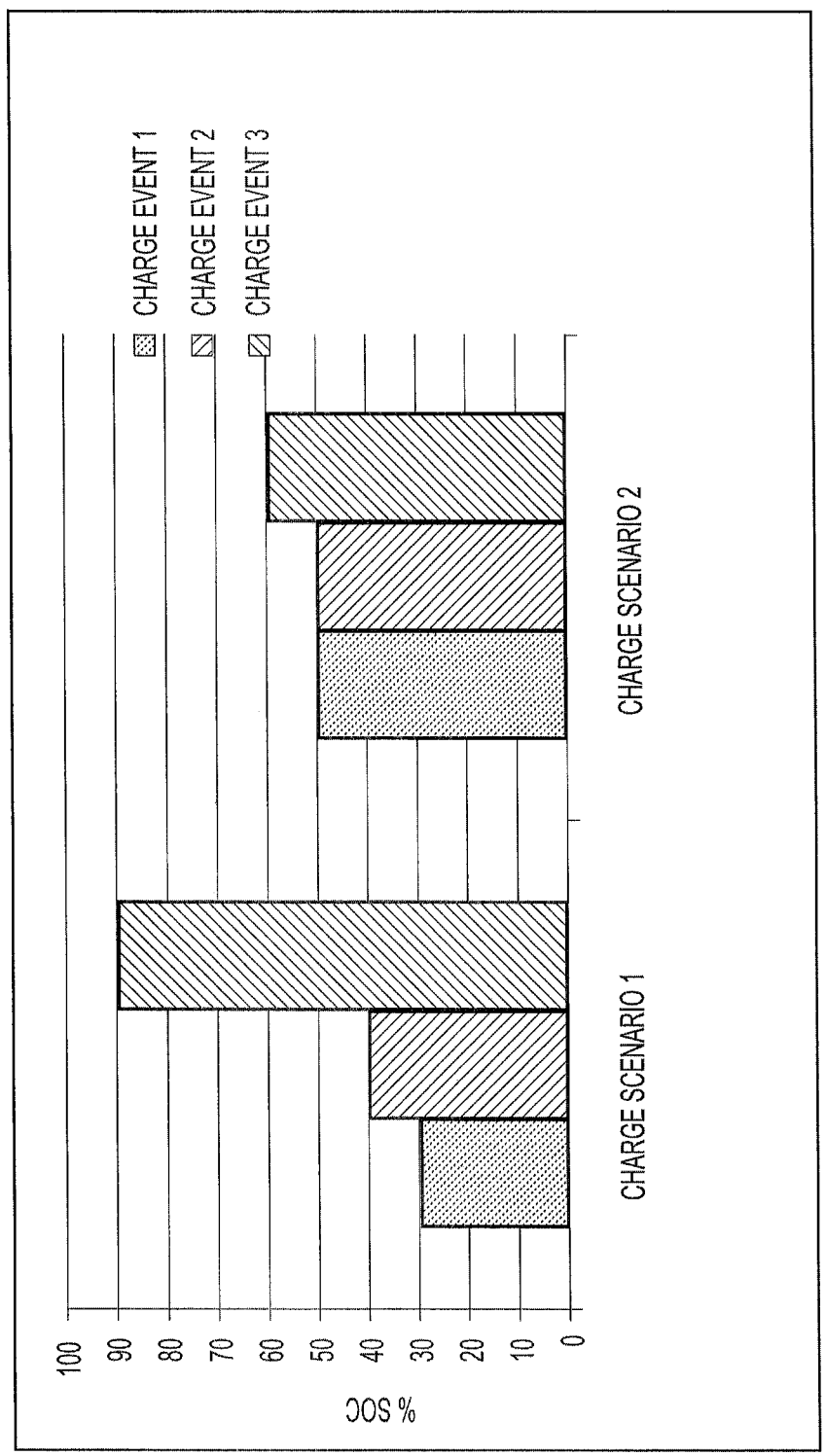
FIG. 14 is a chart showing two charge set point distributions for operation of an electric vehicle according to an embodiment of the invention.

The charge and consumption algorithm shown in FIG. 4 may also incorporate an optional process where the charge set points for subsequent charging opportunities are adjusted to modify the charge rate distribution. For example, FIG. 14 is a chart showing two charge set point distributions for operation of an electric vehicle according to an embodiment of the invention. Both charge scenario 1 and charge scenario 2 incorporate three different charging events. In charge scenario 1, the electric vehicle may be in limited operation during the drive cycles accompanying charging events 1 and 2, which requires that the battery cells only be charged to 30% and 40% SOC during the accompanying drive cycles. However, operation of the electric vehicle following charging event 3 may require that the battery cells be charged to 90% of capacity to allow it to complete its projected route, for example due to drastically increased demand, a change in route in the third drive cycle, or other factors. If the electric vehicle only has a fixed duration to complete its charging event, a high rate of charge may be required during charging event 3 to charge the battery cells to the required capacity within the allotted amount of time. Depending on the characteristics of the specific chemistries used for the battery cells, using a high rate of charge or c-rate may reduce the life of the battery cells. For example, many battery cells exhibit a non-linear degradation of life at higher C-rates. However, a modified set point adjustment process could be used to modify the charge set points to allow the electric vehicle to complete its projected routes, while also maximizing the life of the battery cells.

FIG. 14 is a simplified flow chart showing a set point adjustment process according to an embodiment of the invention. In step 302, battery cell information is obtained. For example this information may comprise the chemistries used in the battery cells, degradation curves of the battery cells depending on C-rates, or information about the current state of the battery. In step 304, the difference between projected charge set points is determined. This may be performed by creating or accessing a delta set point table or other similar data structure which contains projected set points and through which the difference in charge set points may be determined, for example as a step height function of the charge set points. For example, step 304 may also take into account projected future charging events, including accounting for charging events that were skipped due to one or more long-term or short-term modifiers, such as a high demand rate for the cost of electricity. In step 306, calculations are performed to determine potential charge distributions that will allow the electric vehicle to complete its projected route. This may be accomplished by performing statistical analysis on the tabled data to create various charging scenarios. For example, charge scenario 1 and charge scenario 2 are two examples of different set point distributions that would also have different charge distributions to reach the desired set points. As discussed previously, charge scenario 1 could require a use of a high c-rate in the third charging event, resulting in a wide charge distribution that could negatively impact the battery life. In comparison, use of charge scenario 2 would allow for the use of lower c-rate charging through all three charging events, which could result in the battery cells being able to cycle within their "sweet spot," which would improve their life. The increased amount of charge added in the first two charging events in charge scenario 2 would allow the electric vehicle to complete the drive cycle accompanying the third charging event, despite the third charging event only adding a reduced amount of charge to the battery pack. In a specific embodiment of the invention, it may be desired to maintain a narrow distribution between charge rates. For example, step 306 may be used to take incremental steps to minimize the c-rate required to complete the projected drive cycles, which would maintain a tight band on the c-rate distribution between charging events. For example, the following formula may be used to determine if the projected [set point] should be modified.

$$\Delta_{(i+1)-i} < \Delta_{(i+2)-i} \div 2 < \Delta_{(i+3)-i} \div 3, \text{ then adjust } S_{i,j}$$

Under this calculation, if the change in charge rate distribution is less when measured across multiple charging events, then the charge set points may be adjusted until the variation in charge rate distribution across charging events may be reduced.

Step 306 may also be modified to accommodate for projected future charging events, in that an increased amount of charge may be required for earlier charge events to allow the electric vehicle to operate despite skipping one or more charging events in the future. For example, if the electric vehicle normally charges once per hour on its regular schedule but is scheduled to miss a charging event at 12 PM and 1 PM due to a high demand rate for electricity, additional charge may be added to the battery packs for the electric vehicle in earlier charging events to allow the vehicle to continue to operate despite those missed charging events. Instead of charging the battery packs to a higher level solely at the 11 AM charging event, the calculations in step 306 may provide for alternative charging levels wherein the battery packs are charged to a higher level during several earlier charging events to minimize the charge rate distribution and increase the life of the battery packs. In the example described above, the battery packs could be charged to a higher level at 9 AM, 10 AM, and 11 AM rather than charging to the regular level at 9 AM and 10 AM, but drastically increasing the charge amount at 11 AM to allow the vehicle to operate on its projected route.

In step 308, a charge set point scenario is selected to maximize the life of the battery packs. In most situations, it may be desirable to minimize the charge rate distribution across charging events. However, different battery chemistries or battery setups may make it advantageous instead to modify the charge rate distribution in another manner to improve the life of the battery cells, for example by creating a wider charge rate distribution. Such modifications may be performed in step 306 by selecting the distribution of charge set points that results in the widest charge rate distribution. For example, charge scenario 1 would be selected over charge scenario 2 if a wider charge rate distribution would improve the life of the battery cells.

Figure 15:
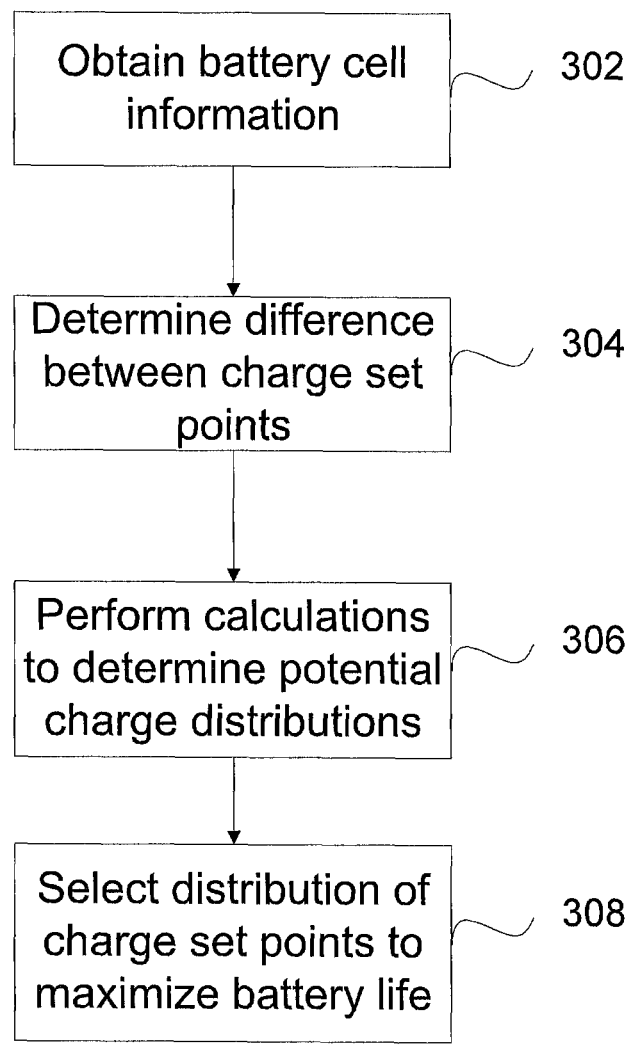
FIG. 15 is a simplified flow chart showing a set point adjustment process according to an embodiment of the invention.

The set point adjustment process shown in FIG. 15 may be integrated into the charge and consumption algorithm shown in FIG. 4, for example as step 112. Alternatively, the charge and consumption algorithm may operate independently of the set point adjustment process without taking the charge rate distribution into consideration. While the example described in relation to FIG. 14 described the use of two charge scenarios, a greater number of charge scenarios may be considered with the charge scenario having the optimal charge rate distribution selected for implementation based on the input received at that time. The set point adjustment process may be continually updated with new information that may modify the charge strategy of the battery packs in real time. For example, in charge scenario 1, if the projected consumption preceding the second charging event drastically decreased, the charge rate for the second and third charging events could be modified to maintain a narrow charge rate distribution for subsequent charges. In another embodiment of the invention, the chart shown in FIG. 14 could also be modified to display charging C-rates for each charging event on the Y-axis in place of the % SOC. For example, it may be less desirable in some instances to charge the battery packs at 2 C, 2 C, and 4 C for three consecutive charging events rather than charging the battery packs at 2.67 C, 2.67 C, and 2.67 C for the three consecutive charging events, as a narrower charge rate distribution could provide for an increased battery life.

Embodiments of the invention may be implemented entirely on-board the electric vehicle, implemented remotely from the electric vehicle and transmitted to the electric vehicle through one or more communication methods, or implemented in part on-board the electric vehicle with some portion implemented remotely. For example, embodiments of the invention could be implemented within the BMS management system, in a separate charge control system, integrated within other existing elements of the electric vehicle's systems, or some combination of the above. Alternatively, embodiments of the invention could be implemented remotely, for example in a vehicle management system used in conjunction with the operation of a fleet of electric vehicles, through the use of control systems located on or near the fixed charging apparatus used to charge the battery cells of the electric vehicle, at a remote location capable of receiving and transmitting charging parameters and other information about the operation of the electric vehicle, or some combination of the foregoing. For example, information about the operation of the electric vehicle could be obtained by on-board hardware, including SOC information, current user load, battery pack health, and others. However, other information could be obtained by one or more remote systems, including weather information, smart meter rate changes, transit agency operating data from other electric vehicles, and others. Processing of such information in accordance with an embodiment of the current invention could be performed entirely onboard the vehicle, performed at a remote location and transmitted to the vehicle through one or more communications methods such as 3G/4G, Wifi, Bluetooth, or others, or some combination of the foregoing. Additional implementations other than those described herein would be apparent to a person of skill in the art, and it is contemplated that the invention will also cover such modifications, variations, and equivalents.

Embodiments of the invention may involve the use of other components used within the electric vehicle or charging apparatus to meet charging requirements, as described in U.S. Patent Applications 61/328,143 and 61/289,755 titled respectively, "Fast Charge Stations for Electric Vehicles in Areas with Limited Power Availability" and "Charging Stations for Electric Vehicles", which are hereby incorporated by reference in their entirety. For example, a fast charge capable BMS may also be integrated into the packs and/or modules to give early warning to potential problems with weaker battery cells within a string. The BMS can give accurate feedback on cell voltages and temperatures within the modules in order to ensure a healthy battery pack and may be adapted to monitor the increased voltages during the rapid charging process. If there are any problems with a particular string, those modules can be automatically removed from service and the vehicle can operate on reduced capacity until the end of the day if necessary. The BMS can disconnect a battery string if a fault is detected. Even if an entire battery string is disconnected, the vehicle is capable of operating. A BMS may be a primary detection method of a problem with a particular cell, module, pack, or string. The BMS may detect when a failure occurs and may be able to direct the battery assembly to disconnect portions of the battery assembly, such as individual battery strings, where the failure may have occurred, in order to prevent other portions of the battery assembly from being compromised and to allow continuous operation of the vehicle. The BMS may communicate with and within each pack to achieve the desired level of detection and management.

Figure 16:
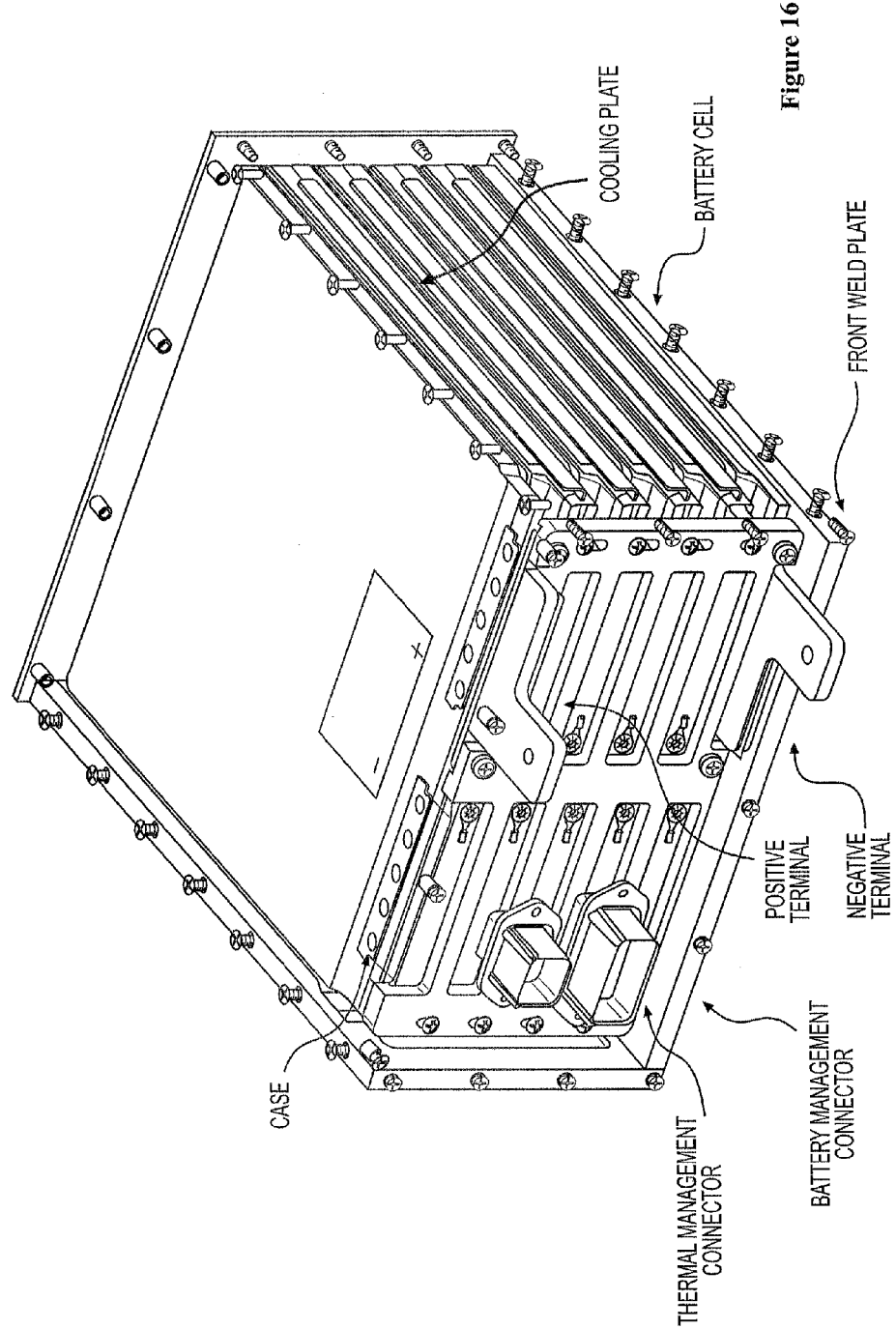
FIG. 16 shows an example of a module in accordance with one embodiment of the invention.

Embodiments of the invention may be implemented at the module, pack, or string level. For example, FIG. 16 shows an example of a module in accordance with one embodiment of the invention. The case of a module may be made of an ABS material that can be easily machined and produced very rapidly. In other implementations, the case of a module may be of other materials, such as a composite material, fiberglass, or carbon fiber. In some examples, the case may be made from a material that may provide some level of isolation, such as a material that may not burn when exposed to an electric arc. A front weld plate can be included to accurately locate and hold the terminals to the case to reduce fatigue stress cracks in the cell tabs. In some cases, the cell tabs may be made of a metal, such as aluminum. BMS connectors can be integrated into the front of the module for quick connection of an off-board BMS. Terminals may be offset and tapped for vertical installation of attachment bolts and ease of assembly.

Modules must be isolated from each other to protect against potential short-circuiting. This can be accomplished through careful material selection and post processing of the heat sinks. If a short is ever detected through the BMS, the system may disconnect each pack in the string, which can isolate the fault. This level of safety may be included in the event of a major crash or failure of the isolation system.

Figure 17:
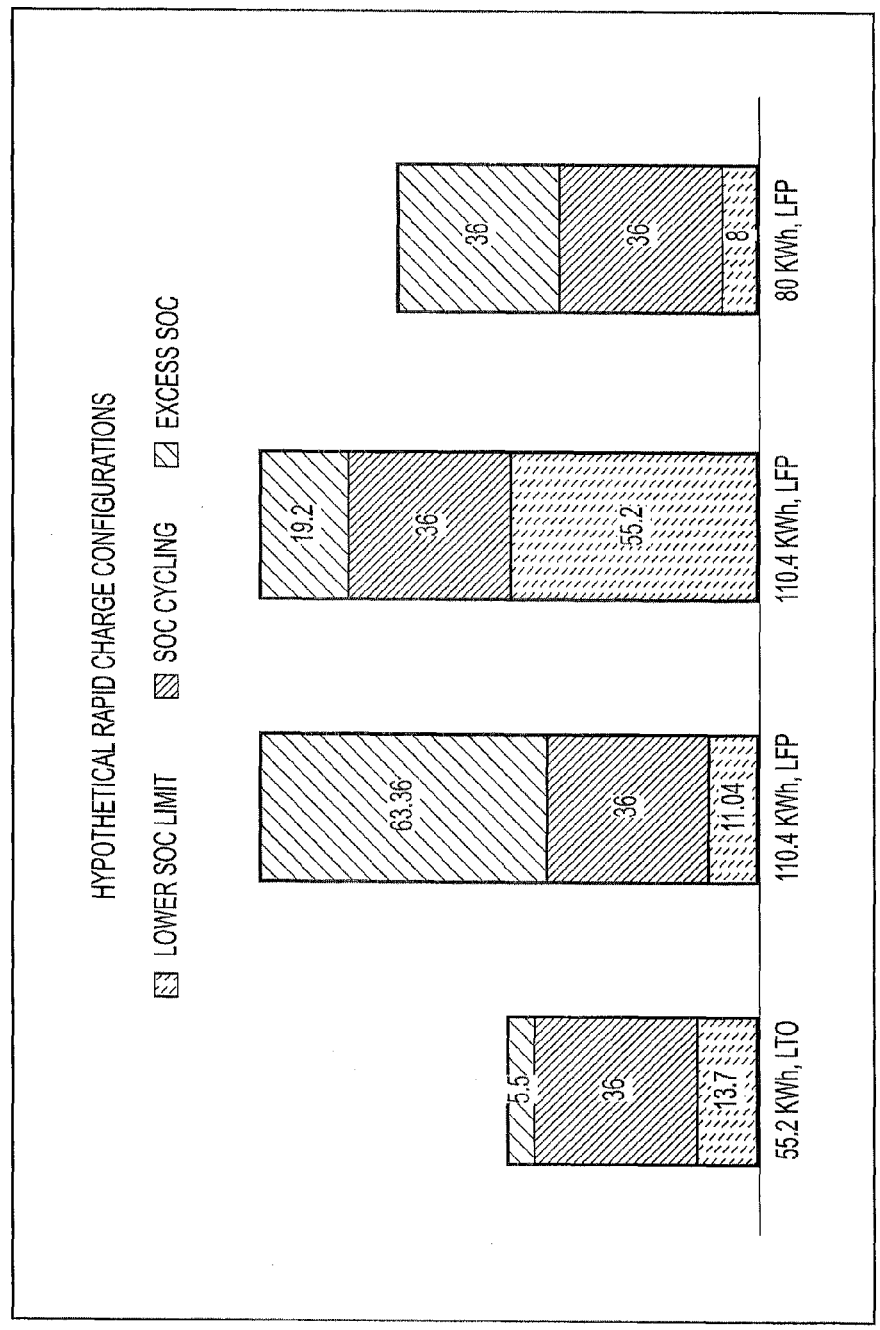
FIG. 17 shows several different rapid charge configurations that can be used for systems of different charge capacities according to embodiments of the invention.

FIG. 17 shows several different rapid charge configurations that can be used for systems of different charge capacities according to embodiments of the invention. The first charge configuration on the left uses an LTO battery chemistry with relatively little excess SOC, which results in the charge configuration being nearly completely filled during each rapid charge. The second charge configuration utilizes an LFP battery chemistry, but is similar to the first in that the SOC cycling range is similar between the two charge configurations, allowing for the use of a similar set charging schedule as used in the first charge configuration. The SOC cycling range can be set to the "sweet spot" of the battery cells used in the energy storage system which may maximize the life of the battery cells and reduce the cost of ownership. For example the optimal cycling range may be from 10-40% of total charge, 20-60% of total charge, or another range, depending upon the battery cells used and the specific configuration used in the energy storage system. The second charge configuration does have a much larger excess SOC which may or may not be used during operation of the system. The third charge configuration shifts the SOC cycling range to a much higher level of the total charge, which can allow for a greater flexibility in whether the electric vehicle must return to recharge. The fourth charge configuration is a smaller system with less charge capacity that has a similar SOC cycling range as the first and second charge configurations, but with a smaller amount of excess SOC than the second charge configuration. Other charge configurations could also be used according to embodiments of the invention, depending upon the total charge capacity of the system, the desired usage of the system and the specific configuration of the system, among other factors. For example, a charge configuration similar to that for the third charge configuration could be used for an 80 kWh system, albeit with a reduced lower SOC limit due to the smaller capacity of the system.

Figure 18:
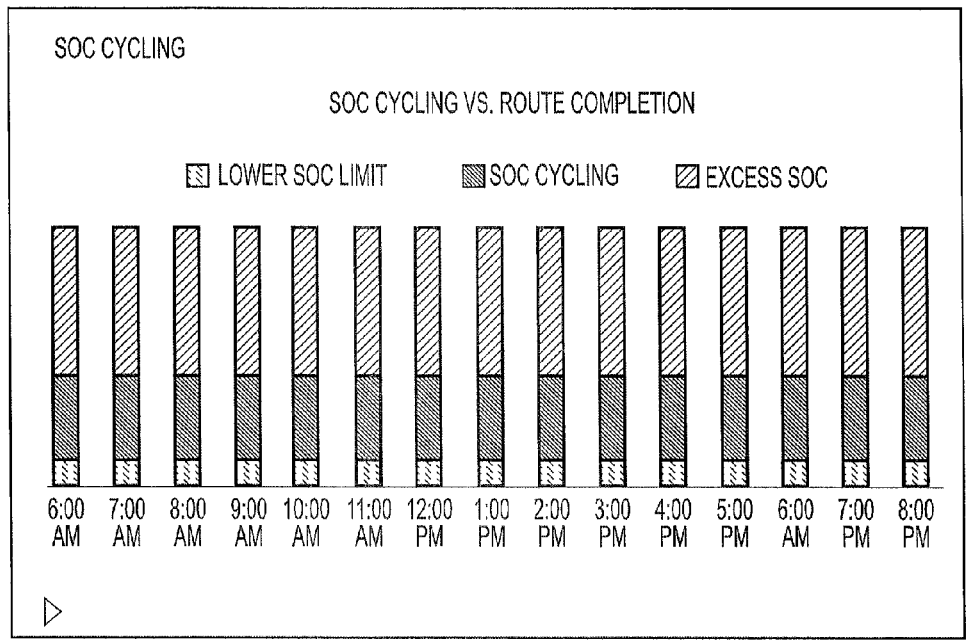
FIG. 18 shows a chart displaying SOC cycling for a set schedule for hourly charging of an electric vehicle on a fixed route according to an embodiment of the invention.

FIG. 18 shows a chart displaying SOC cycling for a set schedule for hourly charging of an electric vehicle on a fixed route according to an embodiment of the invention. Within each predetermined period (an hour in this instance), the electric vehicle travels its route and the SOC of its energy storage system is depleted from the level at the top of the SOC cycling range to a lower level at the conclusion of the route. The vehicle may cycle through its SOC in approximately 30-40% of the lower half of its range every hour. Following route completion, the electric vehicle is rapidly recharged to the top of its SOC cycling level and may continue on its route having a similar SOC as during the beginning of its previous route. The SOC cycling range may be selected to match the "sweet spot" of the battery cells used in the energy storage system, which may maximize the life of the battery cells. An additional advantage of using a set charging schedule is ease of use, as a single charging schedule may be used for the electric vehicle throughout the day and additional charging schedules are not needed. This may reduce the complexity of the programming required for charging, described in more detail below.

Figure 19:
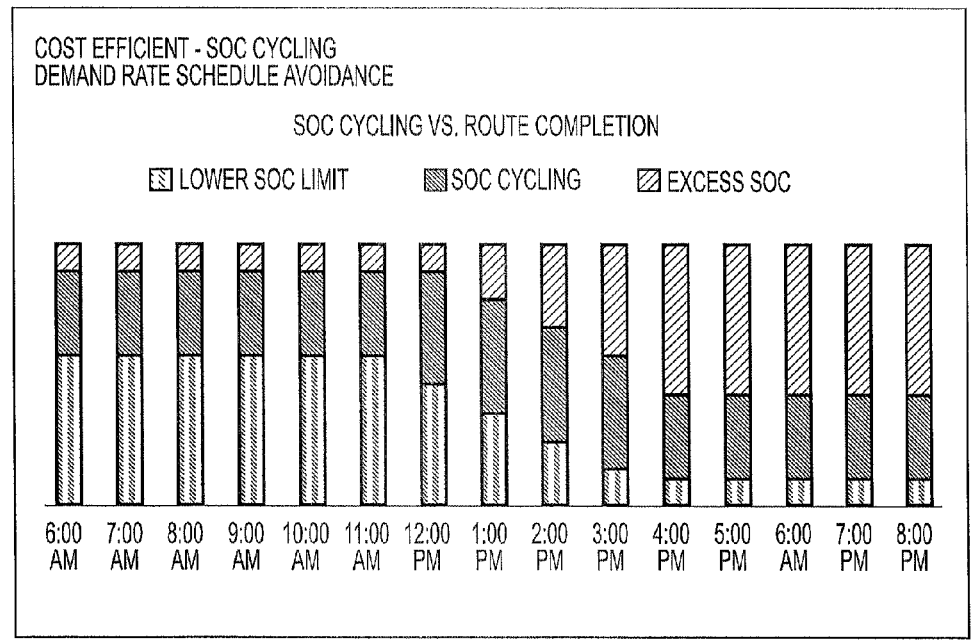
FIG. 19 shows a chart displaying SOC cycling for a variable schedule for hourly charging of an electric vehicle on a fixed route according to an embodiment of the invention.

FIG. 19 shows a chart displaying SOC cycling for a variable schedule for hourly charging of an electric vehicle on a fixed route according to an embodiment of the invention. The excess SOC capacity of the vehicle may allow for some flexibility on when SOC cycling takes place as well as whether a charging event takes place every hour. For example, an electric vehicle may fully charge at night, as shown in the 6:00 AM charge configuration with the vehicle at peak charge. The 6:00 AM charge configuration shows a minimal amount of unavailable SOC, with a large lower SOC limit that may be periodically used to extend the range of the vehicle as needed without needing to return to recharge. For example, a large energy capacity may allow the electric vehicle to be fully charged at night and drive the early morning hours with SOC cycling within the upper half of its range. As the demand rate for electricity increases during the day due to increased utility grid loading, the electric vehicle can make use of the excess SOC onboard to minimize or avoid charging during peak hours, thereby shifting the SOC cycling to the lower half of its range, until the electric vehicle returns to charge or concludes its route at the end of the day. This can reduce the cost of operation for the owner of the electric vehicle by taking advantage of lower electricity rates at night, when demand is lower, as compared to consistently charging the vehicle during the day when the demand rate for electricity is higher.

In another embodiment of the invention, the charge carried in the storage systems of the electric vehicles may also be sold back to the utility grid in times of peak demand when electricity rates are particularly high. This requires that the electric vehicles be docked at their charging station and that appropriate infrastructure and inverters are present to allow the charge to be sold back into the utility grid. This provides additional flexibility to the owner or operator of the electric vehicle and the charging system in that any excess SOC may be returned to the utility grid in times of peak demand at a higher rate, thus lowering the total cost of operation of the electric vehicle. This option may not be present for electric vehicles that were not designed with SOC in excess of their operational requirements, and may need to use all of their SOC to complete their normal transit routes, with little excess SOC available to sell back to the utility grid.

Figure 20:
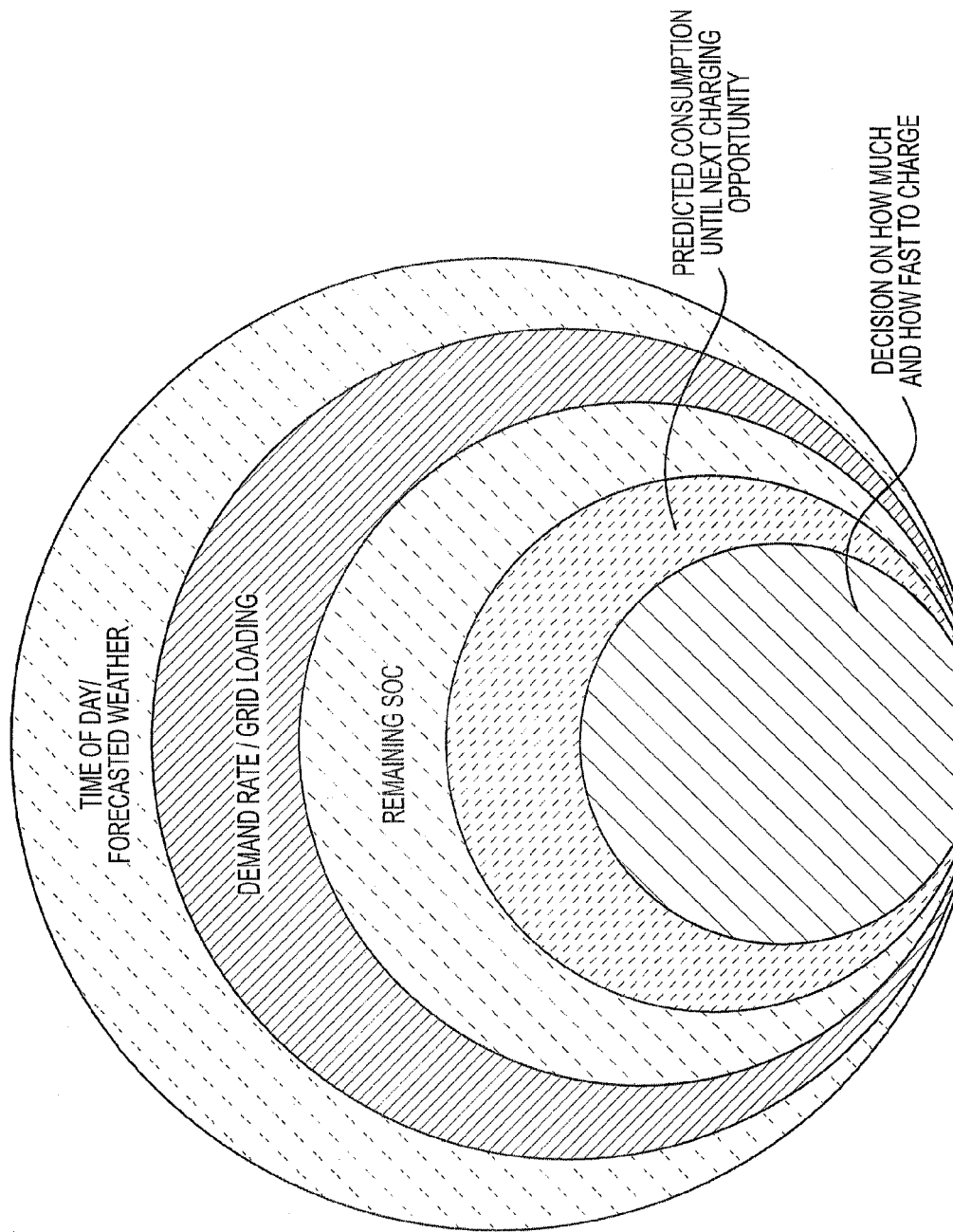
FIG. 20 shows a decision matrix with different considerations that may apply to the real-time charging of an electric vehicle in an embodiment of the invention.

FIG. 20 shows a decision matrix with different considerations that may apply to the real-time charging of an electric vehicle in an embodiment of the invention. The electric vehicle may use a charging and connection system as described in U.S. Patent Application 61/328,152 entitled, Systems and Methods for Automatic Connection and Charging of an Electric Vehicle at a Charging Station, which is hereby incorporated by reference. Implementations of the invention may use an automatic battery charging process control system that controls the charging of the electric vehicle with minimal or no input from the driver. The battery charging process control system may be located on the electric vehicle which communicates with the charging station using either a wireless or wired signal. Alternatively the battery charging process control system may also be located in the charging station, which communicates with signal emitters and transmitters onboard the electric vehicle.

The real-time charge decision matrix may take a number of different factors into account when determining how much and how fast to charge the energy storage system. First, the time of day and forecasted weather may be taken into consideration. Higher temperatures can lead to increased performance, but at the risk of shortened battery cell life, while lower temperatures within the operating range of the battery cells can allow for increased battery cell life. The external thermal effects from forecasted weather and the time of day can be factored into charging calculations, with additional charging taking place if the hot weather is forecasted or during the night or in the early morning to account for reduced battery life later during the day. Conversely, less charging may be performed near the end of the day when temperatures typically are lower, or if cool weather is predicted. Improved thermal management can dramatically improve the life of battery cells by maintaining the operating temperature of the cells within an optimal range, which may be a narrow range around 10° C., 15° C., 20° C., 25° C., 30° C., 35° C., or other ranges. Forecasted weather may also help to predict vehicle HVAC loading and the estimate range of the vehicle as well.

The real-time charge decision matrix may also take into account the demand rate and the load on the utility grid in determining how much and how fast to charge. As described above in relation to FIG. 19, the battery charging process control system may avoid charging at times when the demand rate is high to reduce the cost of operation and have the electric vehicle run instead on the excess SOC contained within the oversized energy storage system. Furthermore, when charge events must take place in the presence of high demand rates, the peak average charge rate numbers may be mitigated by limiting the energy charged in each particular time segment. If hot weather is forecasted and the demand rate on the grid is high, the battery charging process control system can reduce the amount of charging at each stop or not charge at all until later on during the day. For example, a decision could be made to charge during a period of peak demand on the utility grid if the predicted range of the electric vehicle is insufficient to reach the next charging station, based on remaining SOC, forecasted weather conditions, predicted consumption, and other factors. If the vehicle can reach the next charging station, then a higher cost charging event may be avoided.

The remaining SOC may also be taken into account in determining whether and how much the electric vehicle should be charged. For example, the electric vehicle may incorporate charge controllers or other circuitry to monitor and determine the remaining SOC left in the system. The amount of SOC may be communicated to the battery charging process control system to determine whether the electric vehicle should be charged and appropriate charging parameters. If there is little remaining SOC left in the energy storage system, the electric vehicle may be rapid charged to refill the SOC level to a usable capacity. If a large amount of SOC remains, the battery charging process control system could decide to recharge the system to maintain the SOC at a high level to provide additional flexibility for operation later during the day, or decide to not charge or only charge the energy storage system a lesser amount. In some instances, the remaining SOC may be communicated to the driver of the vehicle as a display on the vehicle's dashboard indicating the battery SOC in a similar manner as a fuel gauge. For example, after charging, a full fuel gauge may be displayed.

In some embodiments, the predicted consumption until the next charging opportunity may be taken into consideration. For example, a total required charge (kWh) may be tailored based on historical knowledge of energy consumption of vehicle. Historical usage, predicted future requirements, and knowledge of electrical charges and rate schedules may be considered and used to adjust both charge rate and vehicle charging frequency in order to minimize or reduce electrical demand charges and make the most efficient use of on-board energy storage. For example, if the next predicted charge of the vehicle is predicted to occur in a short interval and the battery state of charge is sufficiently high, it may be desirable to provide only minimal charging to the vehicle. In another example, i f the next charge is predicted to occur after a long interval, it may be desirable to charge the vehicle more. The electric vehicle's route characteristics such as elevation changes, traffic during different times of the day may also be taken into consideration.

Several advantages may be gained by using a real-time charge decision matrix as opposed to using a set charging schedule. First, lower costs may be obtained by optimizing the rapid charging process to forego charging during the peak times and charge instead when the demand rate and the load on the utility grid is low. Increased battery life and lower capital costs may also be achieved by using other charging methods such as slow charging, split charging, pulsed charging, burp charging, rapid charging, or other charging mechanisms at times when rapid charging is not needed, such as night for electric vehicles that normally operate during the day. An increased travel range may also be obtained by charging the electric vehicle fully when the electric vehicle is to embark on a longer route, or when the predicted consumption of energy before the next charging opportunity is high. The advantages listed herein are not meant to be exclusive, and other advantages may be obtained which are evident to those of skill in the art.

While embodiments of this invention have been described in the context of electrical vehicle charging systems used in heavy-duty electric vehicles, other embodiments of this invention may be applicable to any application requiring rapid charging of an energy storage system. In addition to usage in transit systems, embodiments of the application could also be used in any vehicle application that runs on a total cost of ownership proposition, runs a fixed route, benefits from rapid charging, or is less concerned about the initial purchase price of the vehicle.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

All concepts of the invention may be incorporated or integrated with other systems and methods of battery management, including but not limited to those described in U.S. Patent Publication No. 2008/0086247 (Gu et al.), which is hereby incorporated by reference in its entirety.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods include: microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neural network) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, email, etc.) over the Internet and/or other computer networks via one or more data transfer protocols (e.g., HTTP, FTP, SMTP, etc.). When received within a computer system via one or more computer-readable media, such data and/or instruction-based expressions of components and/or processes under the systems and methods may be processed by a processing entity (e.g., one or more processors) within the computer system in conjunction with execution of one or more other computer programs.

Unless specifically stated otherwise, as apparent from the following discussions, it is appreciated that throughout the specification, discussions utilizing terms such as "processing," "computing," "calculating," "determining," or the like, may refer in whole or in part to the action and/or processes of a processor, computer or computing system, or similar electronic computing device, that manipulate and/or transform data represented as physical, such as electronic, quantities within the system's registers and/or memories into other data similarly represented as physical quantities within the system's memories, registers or other such information storage, transmission or display devices. It will also be appreciated by persons skilled in the art that the term "users" referred to herein can be individuals as well as corporations and other legal entities. Furthermore, the processes presented herein are not inherently related to any particular computer, processing device, article or other apparatus. An example of a structure for a variety of these systems will appear from the description below. In addition, embodiments of the invention are not described with reference to any particular processor, programming language, machine code, etc. It will be appreciated that a variety of programming languages, machine codes, etc. may be used to implement the teachings of the invention as described herein.

Unless the context clearly requires otherwise, throughout the description and the claims, the words 'comprise,' 'comprising,' and the like are to be construed in an inclusive sense as opposed to an exclusive or exhaustive sense; that is to say, in a sense of 'including, but not limited to.' Words using the singular or plural number also include the plural or singular number respectively. Additionally, the words 'herein,' 'hereunder,' 'above,' 'below,' and words of similar import refer to this application as a whole and not to any particular portions of this application. When the word 'or' is used in reference to a list of two or more items, that word covers all of the following interpretations of the word: any of the items in the list, all of the items in the list and any combination of the items in the list.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

While certain aspects of the systems and methods are presented below in certain claim forms, the inventor contemplates the various aspects of the systems and methods in any number of claim forms. Accordingly, the inventor reserves the right to add additional claims after filing the application to pursue such additional claim forms for other aspects of the systems and methods.

What is claimed is:

1. A method of charging an energy storage system of an electric vehicle, the electric vehicle being configured to be charged at multiple charging events during an operating period, the multiple charging events including a first charging event and a second charging event subsequent to the first charging event, comprising:

selecting a minimum desired state of charge for the energy storage system, wherein the minimum desired state of charge is a predetermined positive value of charge;

calculating a target maximum state of charge based on at least (a) an estimated energy consumption of the electric vehicle between the first charging event and the second charging event and (b) the selected minimum desired state of charge, such that energy storage system retains the minimum desired state of charge at the second charging event; and charging the electric vehicle to the calculated target maximum state of charge during the first charging event.

2. The method of claim 1 further including, determining an actual minimum state of charge of the electric vehicle at the second charging event, wherein the actual minimum state of charge is the actual value of charge retained in the energy storage system at the second charging event.

3. The method of claim 2, further including adjusting the target maximum state of charge based on a difference between the target and actual minimum states of charge.

4. The method of claim 1, further including determining the estimated energy consumption of the vehicle between the first and second charging events.

5. The method of claim 4, wherein determining the estimated energy consumption includes predicting the energy consumption based on one or more of route information, expected passenger volume, and weather data.

6. The method of claim 1, wherein the operating period is a single day.

7. The method of claim 6, further including determining the estimated energy consumption of the electric vehicle between each two successive charging events of the multiple charging events of a day.

8. The method of claim 1, wherein the minimum desired state of charge is a function of fluctuation in energy cost during the operating period.

9. The method of claim 1, further including adjusting the target maximum state of charge based on the type of configuration of the energy storage system.

10. The method of claim 1, wherein the minimum desired state of charge is between about 10%-40% of a capacity of the energy storage system.

11. A method of charging an electric vehicle configured to be charged at multiple charging events during a day, comprising:

determining an estimated energy consumption of the electric vehicle between a first and a second charging event during the day;

selecting a target minimum state of charge of the electric vehicle, the minimum state of charge being a desired minimum value of charge to be retained in an energy storage system of the electric vehicle;

determining a target maximum state of charge of the electric vehicle based at least on the determined energy consumption and the selected target minimum state of charge;

charging the electric vehicle to the target maximum state of charge at the first charging event;

determining an actual minimum state of charge of the electric vehicle at the second charging event, wherein the actual minimum state of charge is the actual value of charge retained in the energy storage system at the second charging event; and adjusting the target maximum state of charge for the second charging event based on a difference between the target and actual minimum states of charge.

12. The method of claim 11, wherein the first and second charging events are two successive charging events, and wherein determining the estimated energy consumption includes determining the energy consumption between each two successive charging events during the day.

13. The method of claim 11, wherein determining an estimated energy consumption includes predicting the energy consumption based on one or more of route information, expected passenger volume, and weather data.

14. The method of claim 11, wherein determining a target maximum state of charge includes adjusting the target maximum state of charge to reduce the variation in target maximum states of charge at different charging events during the day.

15. The method of claim 11, wherein determining a target maximum state of charge includes adjusting the target maximum state of charge to eliminate a charging event that occurs during a time of high energy cost.

16. The method of claim 11, wherein determining a target maximum state of charge includes adjusting the target maximum state of charge based on the type of configuration of the energy storage system.

17. The method of claim 11, wherein selecting the target minimum state of charge and determining the target maximum state of charge includes adjusting the target minimum state of charge and the target maximum state of charge to increase life of the energy storage system.

18. A method of charging an electric vehicle configured to be charged at multiple charging events during a day, comprising:

determining an estimated energy consumption of the electric vehicle between two charging events during the day;

selecting a target minimum state of charge of the electric vehicle, the minimum state of charge being a desired minimum value of charge to be retained in an energy storage system of the electric vehicle;

determining a target maximum state of charge of the electric vehicle based at least on the determined energy consumption and the selected target minimum state of charge;

adjusting the target maximum state of charge to eliminate a charging event that occurs at a time of high energy cost during the day; and charging the electric vehicle to the adjusted target maximum state of charge.

19. The method of claim 18, further including determining a difference between the selected target minimum state of charge and an actual value of charge retained in the energy storage system at a charging event.

20. The method of claim 19, further including adjusting the target maximum state of charge for a later charging event based on the determined difference.

* * * * *